Nov. 9, 1943.　　F. H. SHEPARD, JR　　2,333,688
DISTANCE MEASURING SYSTEM
Filed Oct. 29, 1937　　5 Sheets-Sheet 1
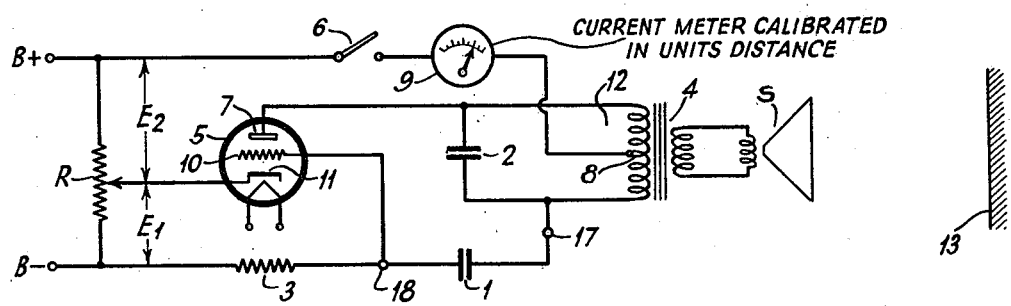
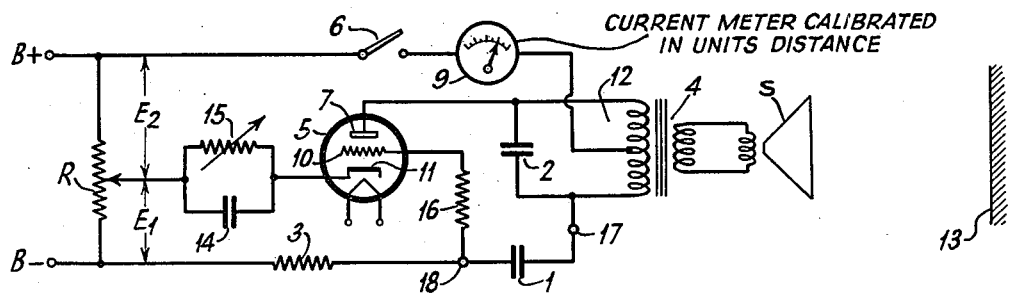
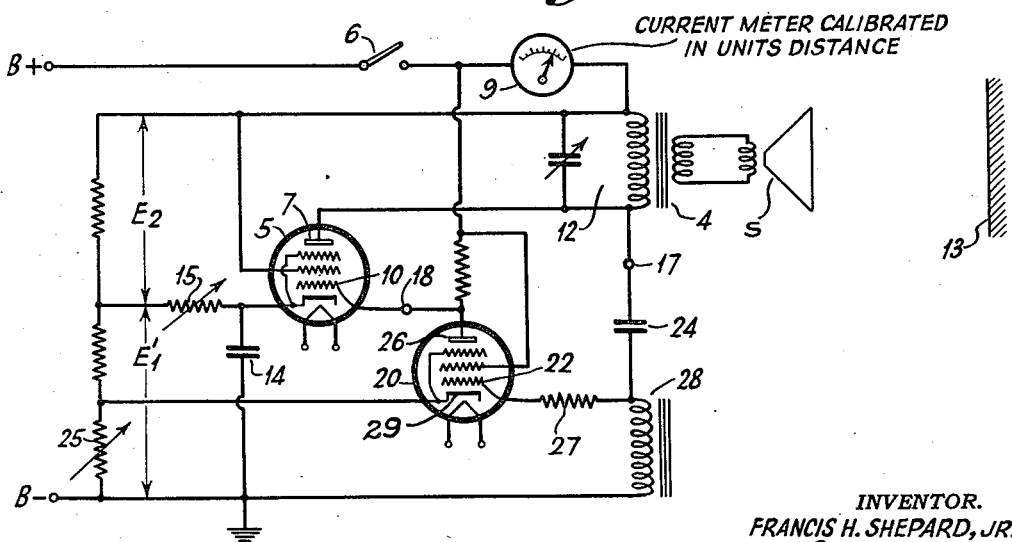
INVENTOR.
FRANCIS H. SHEPARD, JR.
BY
ATTORNEY.

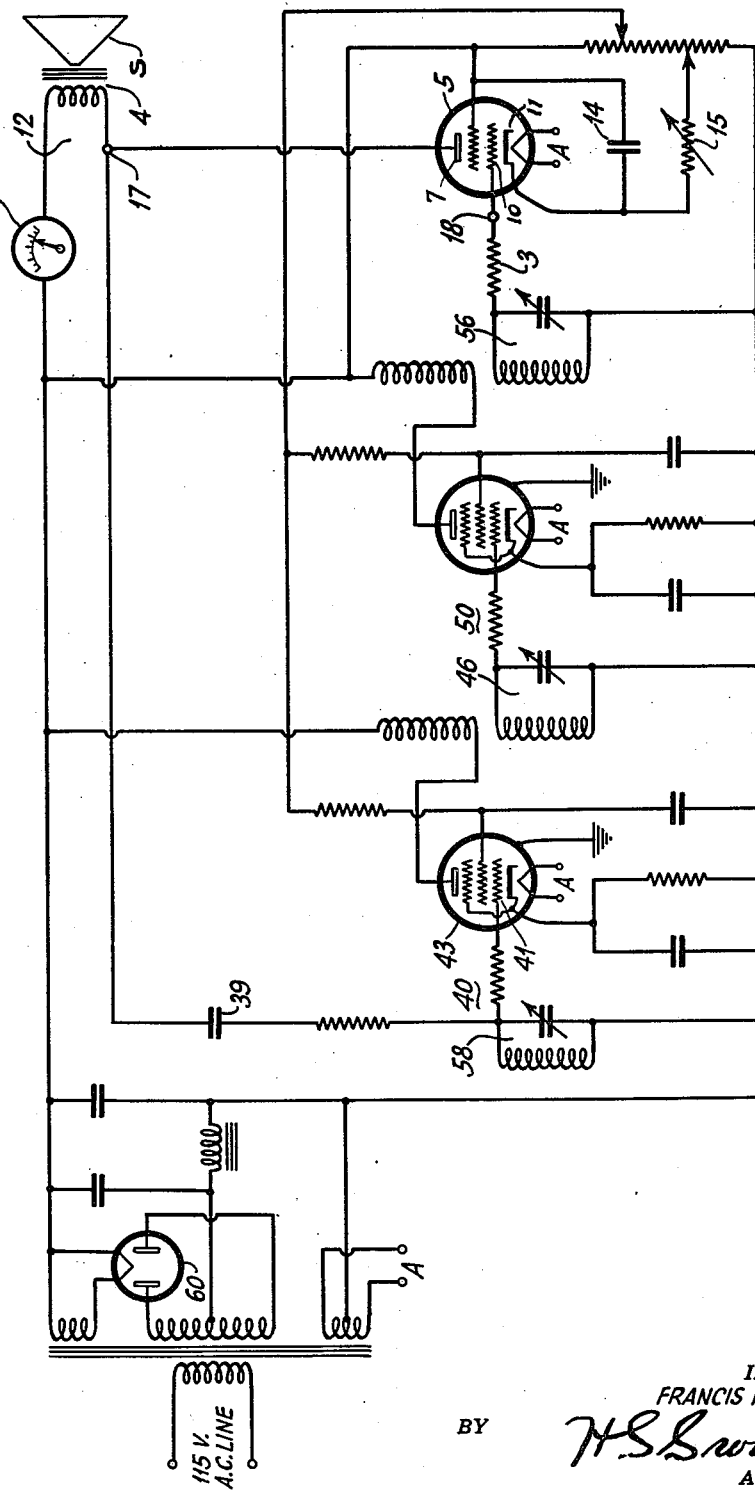

Nov. 9, 1943.  F. H. SHEPARD, JR  2,333,688
DISTANCE MEASURING SYSTEM
Filed Oct. 29, 1937   5 Sheets-Sheet 3

INVENTOR.
FRANCIS H. SHEPARD, JR.
BY
ATTORNEY.

Nov. 9, 1943.    F. H. SHEPARD, JR    2,333,688
DISTANCE MEASURING SYSTEM
Filed Oct. 29, 1937    5 Sheets—Sheet 4

INVENTOR.
FRANCIS H. SHEPARD, JR.
BY
ATTORNEY.

Patented Nov. 9, 1943

2,333,688

UNITED STATES PATENT OFFICE 2,333,688

DISTANCE MEASURING SYSTEM

Francis H. Shepard, Junior, Rutherford, N. J., assignor to Radio Corporation of America, a corporation of Delaware Application October 29, 1937, Serial No. 171,709

10 Claims. (Cl. 177—352)

This application concerns a new and improved means for measuring the distance between two points and involves means for producing wave energy or radiant energy of any type, transmitting the same from one point to any object by which it is reflected, receiving the reflected energy back at the point from which it is transmitted and measuring the time of travel of the energy to thereby measure the distance between the points. The invention is particularly adapted to use in altimeters, sonic depth meters, etc. The radiant energy may be of any frequency such as for example, supersonic wave energy or radiant wave energy.

Figure 5:
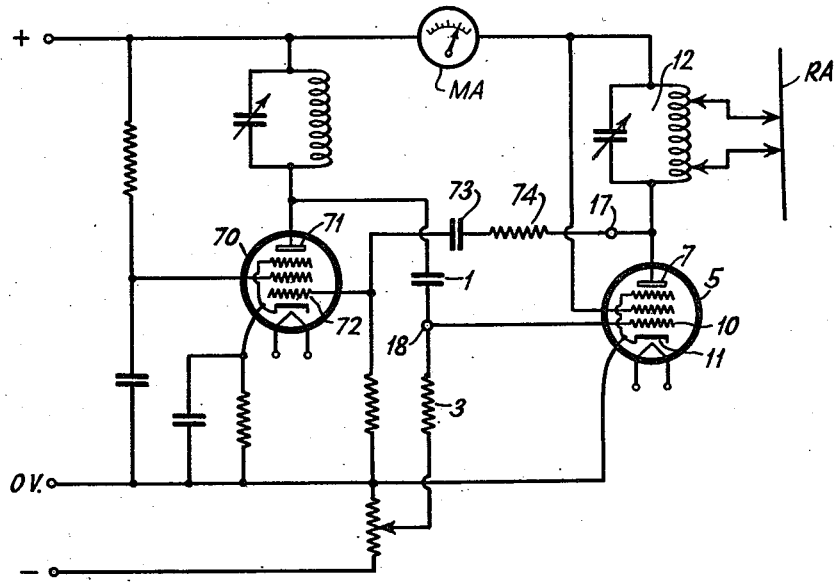
Figure 6:
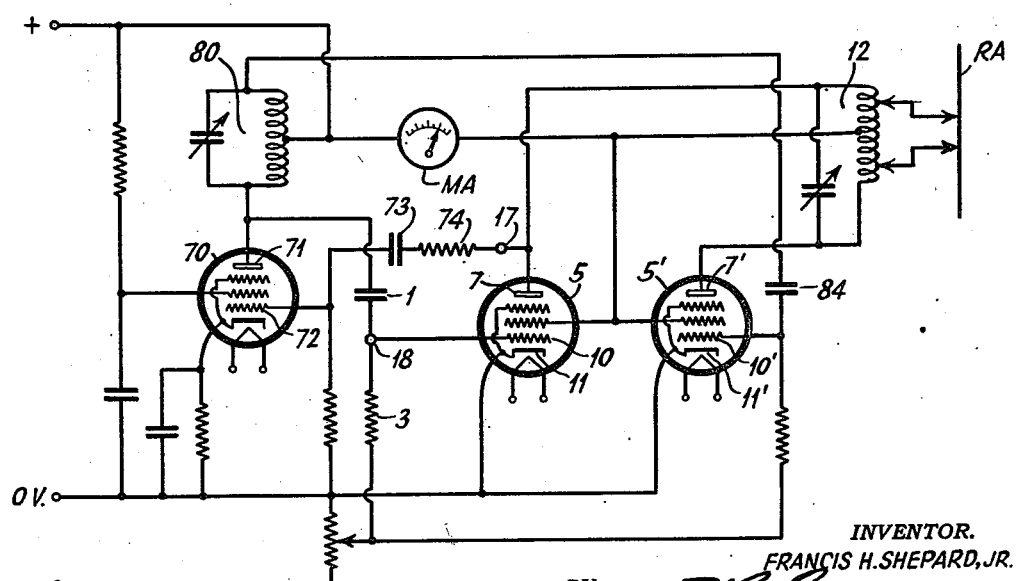

In describing my invention reference will be made to the attached drawings wherein:

Figure 1 to 8 inclusive illustrate various modifications of my new and improved means for producing bursts of oscillatory energy, transmitting the same, receiving the reflected energy and utilizing the received reflected energy to re-initiate the bursts of oscillatory energy. In Figures 1, 5, and 6 tube generating means is used to build up the oscillatory energy used in the interrupted radiation, and blocking of the tube energy to define the bursts is accomplished by blocking means in the grid circuit. In Figures 2, 3, 4, 7, and 8 the blocking means is included in the cathode circuits. In Figures 3 to 8 inclusive amplifying means is interposed between the reflected wave energy responsive means, and oscillating or generating means to amplify the energy which re-initiates oscillation of the blocked oscillating means. Figure 9 illustrates a system wherein a separate radiating device and separate pick-up device are used and amplifying means is used between the pick-up device and the oscillator.

Figure 1 shows an embodiment of my distance measuring system which includes an electron discharge device 5 connected in an oscillatory circuit which includes an inductance 12 tuned by capacitance 2. The plate 7 of said discharge device is coupled to one end of inductance 12. A mid-tap 8 of this inductance is connected through a direct current indicating instrument 9 to the positive supply voltage. The other end of inductance 12 is connected through a coupling condenser 1 to the grid 10 of the electron discharge tube amplifier 5. The grid 10 is connected to the negative end of the voltage supply source through a resistor 3. The cathode of the device 5 is connected to a slider on the potentiometer resistance R' across the direct current supply voltage. The slider makes possible the adjustment of voltage $E_1$ to a point great enough to reduce the mutual conductance of the oscillator tube 5 to a value sufficiently low to prevent self-oscillation until the tube is externally excited.

In operation, switch 6, through which direct current voltage is supplied to the electrodes of the discharge device oscillator, is closed. This momentarily impresses a positive potential on the grid 10 of the tube amplifier 5 due to the voltage drop across resistor 3. As the grid 10 is swung positive the mutual conductance of the oscillator tube 5 rises to a value sufficient to cause it to burst into self-oscillation in a manner well known to those versed in the art. The oscillator system oscillates violently, causing grid 10 to draw electrons from cathode 11, thus charging condenser 1 in such a manner that the average potential of the grid 10 becomes highly negative with respect to the cathode 11. When this happens the time that the grid is held positive, that is, at or slightly above the potential of cathode 11 (i. e., on the positive part of the oscillation cycle) becomes reduced, and the effective mutual conductance of the thermionic oscillator tube 5 is reduced. This in turn, reduces energy fed by the tube into the oscillator tank circuit 12. This causes the amplitude of oscillations of tank circuit 12 to drop in value and consequently the grid 10 is not driven to a sufficiently positive potential to enable the oscillator to maintain oscillations. The time constant of condenser 1 and resistor 3 is such that the collapse of alternating current voltage across the tank circuit 12 is more rapid than the collapse of direct current voltage across condenser 1. This causes the oscillator to become blocked due to the high negative voltage built up on the grid 10. If the value of the voltage $E_1$ is great enough to prevent the oscillator from starting, the oscillator will remain in a non-oscillating condition until some exterior force causes it to start again.

During the time that the oscillator was generating oscillations the energy radiating means S coupled to receive energy from the tank circuit 12 is transmitting radiations into the medium separating the system of the invention from any object 13, the distance to which it is desired to measure. These radiations lasting for a short interval of time, traverse through the medium and impinge upon the surface of the above mentioned object. This object 13 reflects a part of the radiations received. These reflected radiations then travel back through the medium and are picked up by the device S, which now becomes a receiving device which collects energy for transfer across transformer 4 to the tank circuit 12. This energy is of sufficient value to cause an effective voltage to be built up across the tank circuit, thereby to swing the grid 10 positive. Thus the thermionic tube 5 becomes effective to feed sufficient energy back into tank circuit 12 for causing the oscillator to build up and sustain self-oscillation or to re-initiate self-oscillation. From this point the above described cycle is repeated.

As a definite interval of time is required for the above mentioned radiations to pass through the above mentioned medium from radiator S to the object 13 and back again to S, a definite time controlled by this above mentioned interval elapses between the bursts of radiation from S. If the distance between the radiator S and the object 13 is reduced the time is likewise reduced, thus the frequency of the occurrences of the bursts of radiation is increased. As a definite quantity of direct current is passed through the oscillator including 5 for each burst of oscillation or radiation the reading of the direct current meter 9 is directly proportional to the frequency of the bursts of oscillations. As explained above, the frequency of the bursts of oscillations is inversely proportional to the distance. The direct current reading on meter 9 will be an inverse measure of the distance between the radiator S and the object 13. From this it can be seen that a calibration on the meter 9 can be made directly in units of distance. The frequency of the oscillations generated and of the subsequent radiation can be any value such that the wavelength of the transmitted radiation is short relative to the distance between the radiator S and the object 13. The bursts of oscillation in tank circuit 12 may be used to trigger radiations of another frequency or of like frequency in S or in a circuit preceding S. The radiating means S may, as illustrated diagrammatically in Figure 1, comprise means for converting the bursts of oscillation produced in 5, 12, etc., into sound waves of any frequency equal to the frequency of the oscillations of 5 or of different frequency. The same element S may, as shown, serve for radiating and receiving the waves of energy, or separate transmitting and receiving elements may be used at S. In the latter case the receiving means may be more sensitive than the transmitting means to thereby respond better to the reflected energy. Moreover, the radiation may be electrical waves, in which case I replace S by an antenna system of any type, either directive or non-directive. For example, I may use an antenna as shown at RA in Figures 5 and 6. When a radiant energy transmitting means is used, appropriate changes are made in the circuits between the same and the output of the tube 5 to drive the antenna at the desired frequency which again may be the frequency of oscillation of 5 or a different frequency. Here again, the antenna RA may serve as the transmitting and receiving means or separate means coupled to 12 and points 17 and 18 respectively may be supplied for each purpose. The means S of all of the modifications may be modified as described above and also be replaced by two means, one for transmitting and one for radiating.

In the circuit shown in Figure 1 the oscillator blocks in a manner known to those versed in the art. The grid 10 in tube 5 is driven negative by a charge across the blocking condenser 1 obtained by means of the rectifying action between this grid and the cathode 11.

In the circuit shown in Figure 2 the stability, that is, the accuracy of the reading is improved by making the oscillator block in the cathode circuit in a manner to be subsequently described. The circuit shown in Figure 2 is essentially identical to the circuit shown in Figure 1 with the exception that the time constant of resistor 3 and condenser 1 is made approximately equal to the time of one cycle of the generated or carrier frequency and a condenser 14 and resistor 15 are introduced in series with the cathode lead of the oscillator tube 5. A current limiting impedance 16 is inserted directly in series with the grid 10 of the tube. When the circuit of Figure 2 oscillates no enduring charge is built up across condenser 1. However, as the tube oscillates the direct current conducted through the thermionic tube 5 builds up a charge across condenser 14 until the cathode 11 reaches a potential so far positive relative to the grid potential that the mutual conductance of the tube 5 is insufficient to maintain the self-oscillation. This causes the tube to block. As the value of the grid bias $E_1$ is sufficient to prevent the tube from starting self-oscillation after the charge on condenser 14 has leaked off through resistor 15, oscillations will not again be initiated until some external influence starts in. As explained in Figure 1 energy is fed from the tank circuit 12 to the radiator S which transmits radiations through the medium to object 13 from which they are reflected back into radiator or receiver S. This reflected energy on S as explained above, causes energy to be fed to the tank circuit 12, a voltage to be built up across the tank circuit, and a positive voltage to be applied to the grid 10 of sufficient magnitude to increase the tube conductance and enable the tube 5 to amplify and feed sufficient energy back to the tank circuit 12 to further reduce the negative potential on grid 10 and re-initiate self-oscillations.

In case the energy reflected from the object 13 back into the radiator and receiver S is insufficient to swing the grid of the thermionic tube positive enough to re-initiate oscillation, as explained above, it may be desirable to introduce some amplification between point 17 and point 18. The methods of accomplishing this are shown in Figures 3, 4, 5, 6, and 7. It is to be noted that the amplifiers inserted between these two points must have such characteristics that they are not blocked or made inoperative by the large amplitude of signal fed back during self-sustained oscillation of the oscillator. It is also to be noted that where an even or odd number of stages in the amplifier are used proper phase of the feedback should be maintained.

It is also to be noted that in a distance measuring device of this type no neutralization between the input or output is necessary. This is due to the fact that while radiations are being transmitted it is neither necessary nor desirable to receive any reflected energy, and until reflected radiations are being received the oscillator or transmitter is blocked. Hence it is possible to introduce as much amplification as is needed between the receiving device and the control grid of the oscillator tube 5.

In the circuit shown in Figure 2 the amount of current per relaxation that is conducted by the oscillator tube 5 is directly proportional to the value of condenser 14. In this way, it is possible to change the calibration of the distance reading meter 9. For instance, with one value of condenser 14 meter 9 might be made to have a mid-scale reading of 100 feet. By decreasing the size of condenser 14 by a factor of 10 meter reading 9 would have a mid-scale reading of 10 instead of 100. It is also to be noted that each time the distance is cut in half for a given value of condenser 14, the reading of meter 9 is essentially doubled, no matter what part of the scale it is operating on. This condition holds when the duration of the bursts of oscillation or radiation can be considered of infinitesimal duration with respect to the time elapsed between the transmission and reception of radiations.

In the modification of Figure 3 the additional amplification mentioned above for re-initiating oscillations is provided by an additional tube 20 having its control grid 22 connected by a condenser 24 to the point 17 and its anode 26 connected to the point 18. The points 17 and 18 here correspond to the same points of the prior figures. The tube 20 also has its control grid connected to ground by a resistance 27 and a reactance 28 preferably resonant at the frequency of the circuit 12. The cathode 29 is connected to ground by way of the variable resistor 25. Resistor 15, as in the prior modifications, serves as the time constant element in the cathode return circuit of tube 5. The time constants of the circuits of 5 and 20 are such that the tubes oscillate violently for several cycles and then block. The bias to the tube 5 is so adjusted by potentiometer 15 that when the blocking voltage leaks off of condenser 14, tube 5 will not start again by itself. The sounds generated by the speaker S travel to the object over the distance which is to be measured; they are reflected back to S, which has now ceased to transmit and are impressed on elements 4 and 12 and from 12 across condenser 24 and resistor 27 to the control grid 22 of the amplifier 20 which feeds amplified voltages by way of 18 to the control grid 10 of tube 5, whereat the cut off bias is overcome, so that the entire arrangement again oscillates violently to send out a new burst, and to repeat the cycle. In Figure 3 E'₁ is now replaced by E'₁ and this voltage heretofore designated as E₁ includes voltage in resistor 25.

In the above described embodiments, as well as in the modifications hereinafter described, various circuit element values and different tubes may be used and I do not propose to limit myself to any specific circuit element values or any particular type of tubes. However, in one installation, such as illustrated in Figure 3 which I have found to operate very satisfactorily, tube 5 was of the 2A5 type; tube 20 was of the 57 type, resistance 15 was variable between 0 and 20,000 ohms, resistance 25 was variable between 0 and 1,000 ohms, condenser 24 was of .05 microfarad; resistor 27 was of 50,000 ohms and 28 was about 10 henries, while the elements S and 4 were a Jensen high frequency speaker and transformer.

In the modification of Figure 4 the amplifier stages illustrated diagrammatically at 40 and 50 are coupled by resonant circuits 46 and 56 to each other and to the final stage in which blocking occurs. These circuits are preferably tuned to the frequency of oscillation of the radiating element as is the initial circuit 58. The coil 12 on the translator S has one terminal 17 coupled across capacitor 39 and other impedances to the grid 41 in tube 43. Anode potential for the tube 5 is derived from the rectifier system 60 and is fed through coil 12 and terminal 17, to which the anode is connected. When the tube 5 is caused to oscillate the proper phase relation between input and output voltages is obtained by virtue of the use of an odd number of stages. The arrangement is, however, such that the mid-tap shown on the coil 12 in Figure 1 is not required with respect to coil 12 in Figure 4. Here, as in the prior modification, the reflected energy affects the radiating device S which now acts as a microphone and is impressed therefrom on the tuned circuit 58 and the input electrodes of stage 40 for amplification in 40 and 50 and impression on the circuit 56 in the input of the blocked stage including tube 5. Potential for the electrodes of all the tubes may be supplied by the rectifier system 60. This rectifier system and the details of the circuit connections of the stages 40 and 50 need no description since they will be understood readily by those skilled in the art to which this specification is directed. The tube 5 in the blocked stage is a multi-grid tube but functions as in the prior figures. Numerals corresponding to those used in Figure 2 have been applied to the blocking and charging elements.

In the modification of Figure 5 amplification of the re-initiating voltages is accomplished in an electron discharge device 70 having its control grid 72 connected by coupling condenser 73 and resistance 74 to the point 17. This stage 70 is also of the resonant circuit type as in Figure 4 and is impedance and capacitively coupled to the oscillation producing tube 5 wherein the blocking action is accomplished. In this modification the blocking action and condenser is in the grid circuit as in Figure 1, whereas in the modifications illustrated in Figures 3 and 4 the blocking actions and condensers are in the cathode return circuit. The operation here is similar to the operation of Figure 3 except for the grid type blocking and hence needs no further discussion. Here and in Figure 6 the element or means S has been replaced by an antenna RA which radiates and receives bursts of energy of any frequency such as for example, the frequency of operation of 5 or a different frequency.

In the modification of Figure 6 one amplifying stage comprising tube 70 is used between points 17 and 18 to step up the initiating voltage resulting from the reflected wave impinging on the dual purpose device RA which replaces S of the prior figures, at this time acting as a pick-up device. Here, as in Figure 5, point 17 supplies energy through resistor 74 and coupling condenser 73 to the grid 72 of a tube 70 the anode 71 of which is coupled to a tuned resonant circuit and to condenser 1 as in Figure 5. Here, however, the tuned winding 12 is center tapped, as is the inductance of the plate resonant circuit 80. The voltage produced by the reflected wave acting on RA is fed back from point 17 to the control grid 72 of amplifier 70, is amplified in 70 and impressed by means of the condenser 1 on the control grid 10 of a tube 5 which is in this modification in parallel with an additional tube 5', both tubes being connected in a relaxation circuit quite similar to the relaxation circuit of Figure 1. The control grid 10' of tube 5' is also coupled by a condenser 84 to one terminal of the resonant circuit 80 connected with the anode of tube 70. Now, when the blocking charge on condenser 1 is overcome and energy fed to grid 10, this energy is amplified in tube 5, appears in coil 12, and is re-impressed through resistor 74 and condenser 73 on the control grid 72 to produce regenerative effects. The potentials amplified in tube 70 are also set up in tank circuit 80 and potentials of proper phase are supplied from tank circuit 80 to the control grid 10' of tube 5' by way of condenser 84, so that the grids of tubes 5 and 5' are excited in phase opposition and sustained oscillations are produced in the tubes and built up until, due to the grid rectification in the tubes and drop of potential in 3, a negative charge is built up on grid 10 to block tube 5, which consequently blocks tube 5', the tubes of the final stage now remaining blocked until the radiated energy or reflected wave reaches RA to again excite the grid 72. Here it is amplified and impressed from tank circuit 80 and condenser 1 on the grids 10 and 10' to re-initiate oscillation. In this modification as in Figure 1 the blocking action takes place by virtue of reactance 3 and condenser 1 in the grid circuit of tube 5.

Figure 8:
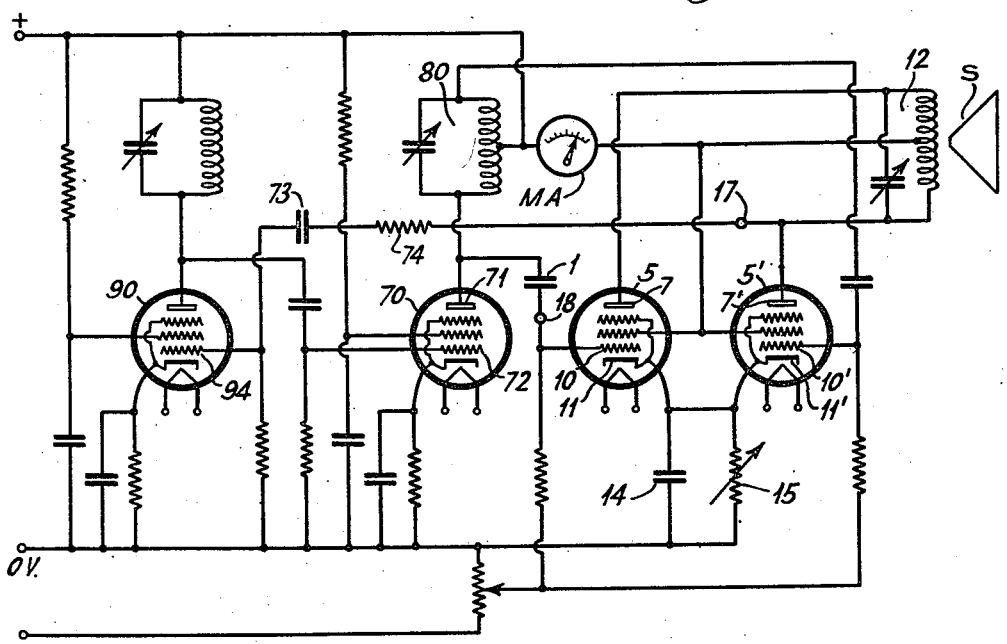
Figure 9:
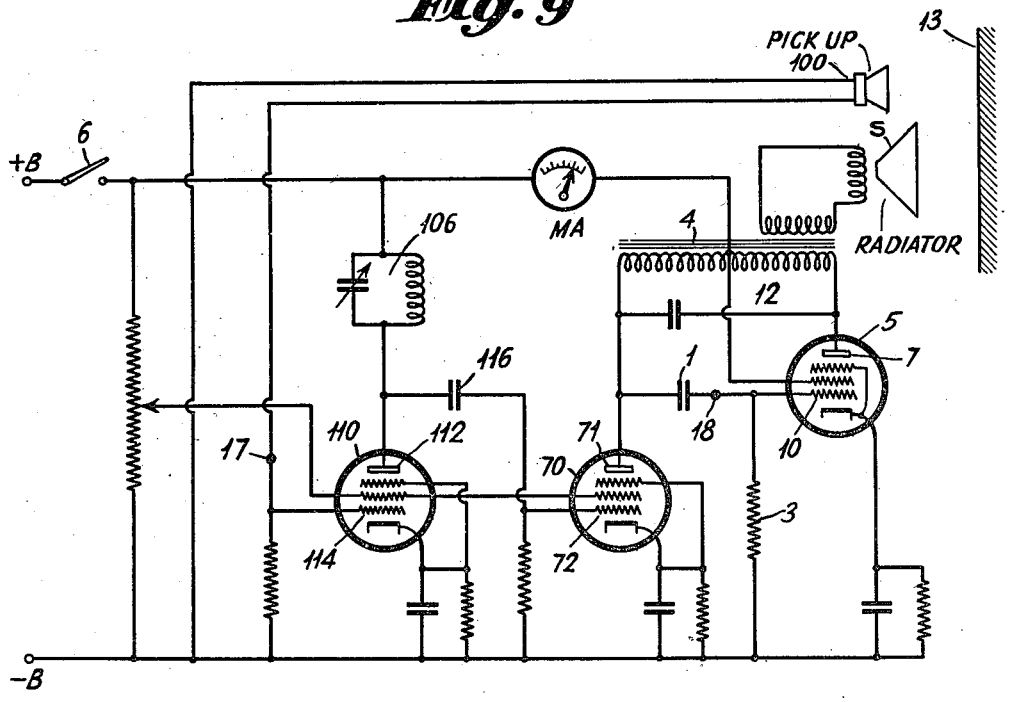

The arrangement of Figure 8 is sufficiently similar to the arrangement of Figure 6 that it is believed unnecessary to describe the arrangement of Figure 8 in detail. However, in Figure 8 an additional amplifying tube or stage 90 has been added preceding the stage 70. We now have an odd number of stages in the system counting the amplifying stages and push-pull blocking stage, and the control grid 94 of tube 90 is connected to a point 17 on the winding of 12 adjacent, as shown, at the end thereof, the anode 7' of tube 5' instead of adjacent the anode 7 of tube 5 as in Figure 6. This insures the desired reversed phase relation between the starting voltage fed by the stage 70 to the grid 10 of tube 5 and the voltage on the anode 7' of tube 5'. The phase displacement of the voltages at the ends of the winding of circuit 80 supplied to the grids 10 and 10' insures production of oscillations in tubes 5 and 5' in Figures 6 and 8. This arrangement operates substantially the same as the arrangement of Figure 6 except that in Figure 6 the blocking condenser 1 is in the grid circuit of tube 5 whereas the blocking condenser 14 in this arrangement is in the cathode return of the push-pull tubes 5 and 5' and blocks both tubes when oscillations become of sufficient amplitude to produce current of the required amplitude through the resistor 15.

Figure 7:
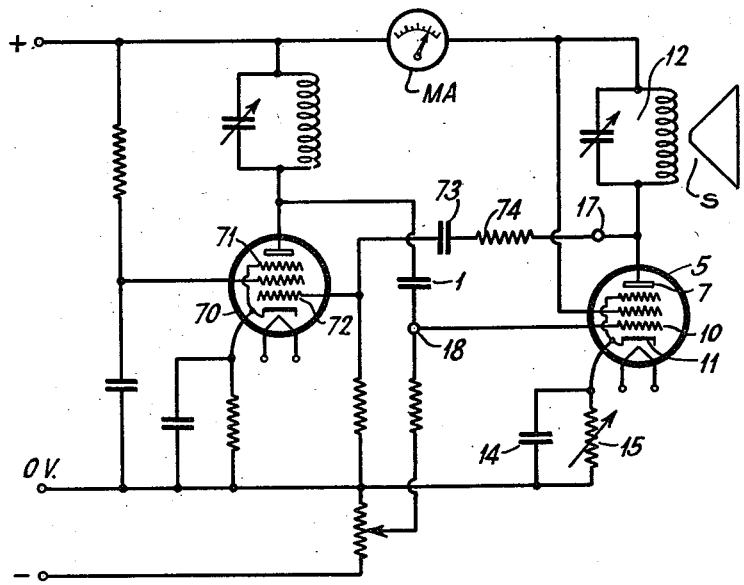

The arrangement of Figure 7 is similar in many respects to the arrangement of Figure 5 and it is believed unnecessary to describe in detail the arrangement of Figure 7. It is noted, however, that in the arrangement of Figure 5 the blocking condenser 1 is in the grid circuit whereas in the arrangement of Figure 7 for the sake of stability, the blocking condenser 14 is used in the cathode return circuit in parallel to resistance 15.

With respect to the embodiments shown in Figs. 4 to 8 inclusive, it will be understood that the initial excitation of the oscillator tube 5 may be obtained the same as in the other embodiments where a switch 6 has been shown for abruptly applying positive potential to the anode of the oscillator 2. Such abrupt application of the operating potential insures shock excitation prior to the reception of reflected waves which constitute the means for subsequent shock excitations.

As stated hereinbefore, the means S of the prior figures may comprise separate radiating and receiving means. In Figure 9 I have shown such an arrangement. The oscillation generating means and re-initiating means including the amplifiers connected with the separate pick-up means 100 are in general as in the prior figures. The amplifier 110 has its control grid 114 connected to 17 and 100 and its anode 112 connected to a reactive circuit 106 and by coupling condenser 116 to the control grid 72 of the amplifier 70 which is arranged somewhat like the correspondingly numbered tube in the preceding figures. In this modification however the anode 71 is connected to a portion of the winding of tank circuit 12 to the direct current source and coupled by 1 to the grid of the oscillator 5. The remaining connections appear to be obvious from an understanding of the prior figures. It is noted, however, that the grid 10 of tube 5 is coupled to one end of the inductance of 12, the other end of which is connected to the anode 7 of tube 5.

When the switch 6 is closed, oscillations build up in tube 5 due to the grid and plate coupling through the tank circuit 12 and are radiated from the translator S. The tubes 110 and 70 permit this production of a burst of oscillations by tube 5. The above described blocking action produced by condenser 1 and resistor 3 blocks tube 5, and oscillation production stops. The burst of oscillations is radiated, reflected from the object 13, picked up by the device 100, amplified in tube 110, impressed on the grid 72 of tube 70, and produces a voltage in one end of the winding of tank circuit 12 and on the grid 10 of tube 5. This voltage overcomes the blocking bias on the grid 10 and tube 5 oscillates violently to repeat the cycle. The meter MA as in the prior figures, indicates current flow, thereby indicating the frequency of the bursts of oscillations and the distance to the reflecting object. The meter may also be placed between the anode 7 of tube 5 and the winding of tank circuit 12.

I claim:

1. In a system operating on the reflection principle for determining the distance between two points, an oscillator comprising a tube of the multi-electrode type having electrodes connected in oscillatory circuits and biased by potentials which permit externally initiated oscillations to be momentarily self-sustained in said tube and circuits, means including circuit components of said oscillator of such value as to produce self-blocking of said oscillator upon completion of a substantially predetermined number of externally initiated oscillations therein, means excited by one of said circuits for sending out wave energy characteristic of the duration of said oscillations, and means in said circuits excited by reflected wave energy for re-initiating the above mentioned oscillations in said tube and circuits.

2. In a system operating on the reflection principle for determining the distance between two points, an oscillator comprising a tube of the multi-electrode type having electrodes connected in oscillator circuits and biased by potentials which permit externally initiated oscillations to be momentarily self-sustained in said tube and circuits, means for applying excitation to said oscillator, thereby to produce a train of oscillations therein, capacitive and resistive means in said circuits of such value that said tube becomes blocked on the completion of a substantially predetermined number of cycles, an electromechanical vibrator element excited by one of said circuits for sending out wave energy characteristic of the duration of said oscillations, and capacitive means in one of said circuits charged by energy resulting from said reflected wave energy acting on said electromechanical means for reinitiating the above mentioned oscillations in said tube and circuits.

3. In a system operating on the reflection principle for determining the distance between two points, an oscillator comprising a tube of the multi-electrode type having electrodes connected in oscillatory circuits and biased by potentials which permit externally initiated oscillations to be momentarily self-sustained in said tube and circuits, means for applying excitation to said oscillator, thereby to produce a train of oscillations therein, electrical elements in one of said circuits of such value that said tube becomes blocked on the completion of a substantially predetermined number of cycles, means excited by one of said circuits for sending out wave energy characteristic of the duration of said oscillations, amplifying means connecting one of said circuits to a certain electrode in said tube, and means in one of said circuits excited by reflected wave energy for impressing energy through said amplifying means and upon said certain electrode in said tube for re-initiating the above mentioned oscillations in said tube and circuits.

4. In a system operating on the reflection principle for measuring the distance from a transmitting station to a reflecting object, an electron discharge device having an anode, a cathode, and a control electrode, and at least one other electrode, said device being located at said transmitting station, a parallel resonant circuit connected with the anode of said device, wave energy producing and radiating means coupled to said resonant circuit, a source of direct current potential connecting a point on said resonant circuit to the cathode of said tube, a capacitively shunted resistor in circuit between said source and said cathode, capacitive means coupling the control electrode of said tube to a point on said resonant circuit, resistive means connecting the control electrode of said tube to said source of direct current potential, said resistive means in combination with said capacitive means constituting an arrangement for causing said discharge device to emit a series of impulse trains and to be automatically blocked between said trains, the initiation of each train being in response to the reception of a reflection of the next preceding train, and current indicating means in one of the connections between an electrode in said tube and said source of direct current potential, for indicating the rate at which said trains of impulses are emitted.

5. In a system for determining the distance between a transmitting station and any reflecting object, an electron discharge device having an anode, a cathode, and a control grid located at said transmitting station, a resonant circuit connected with the anode of said discharge device, wave energy producing and radiating means coupled to said resonant circuit, a source of direct current potential, a current indicating means connecting a point on said resonant circuit to said source of direct current potential, resistive and capacitive means in parallel coupling the cathode of said discharge device to a point on said direct current source, a reflected wave receiving means including said resonant circuit in combination with a second electron discharge device having input electrodes and output electrodes, means coupling the input electrodes of said second discharge device to a point on said resonant circuit, and means coupling the output electrodes of said second discharge device to the control electrode of said first named discharge device, the elements thus far recited in this claim being so arranged for mutual cooperation that the first said discharge device oscillates intermittently and blocks automatically after emitting a brief wave train, and is unblocked only upon the application thereto of externally derived excitation such as by reception of reflected wave energy originating from a previously radiated one of said trains.

6. In a system operating on the reflection principle for determining the distance between two points, a relaxation oscillator comprising an electron discharge tube and circuit components connected to suitable electrodes thereof, said components having time constants of such value as to produce self-blocking of said oscillator upon completion of a substantially predetermined number of externally initiated oscillations therein, an element excited by said oscillator for sending out wave energy characteristic of the duration of said oscillations, means coupled to said oscillator and excited by energy resulting from reflection of said wave energy by an object in the path thereof for re-initiating oscillations by shock excitation, and means for measuring the frequency at which such shock excitation is repeated.

7. In a system operating on the reflection principle for determining the distance between two points, an oscillator of the electron discharge tube type having electrodes connected in oscillatory circuits and biased by potentials such that, upon momentary external excitation, self sustained oscillations are produced in said tube and circuits, means including a capacitor the charging of which operates to stop the production of oscillations in said circuits on the completion of a substantially predetermined number of cycles, means coupled to one of said circuits for sending out wave energy during the production of said oscillations, means for initiating a train of oscillations in said tube and circuits, means excited by reflected wave energy for re-initiating the production of oscillations in said tube and circuits, and means for indicating the flow of current in one of said circuits.

8. In a system operating on the reflection principle for determining the distance between two points, an oscillator comprising a tube having electrodes connected in oscillatory circuits and biased by potentials such that, upon momentary external excitation, self sustained oscillations are produced in said tube and circuits, a capacitor suitably connected in one of said circuits to be charged during the production of said oscillations, said capacitor being of such value as to cause said tube to become blocked on the completion of a substantially predetermined number of cycles, means for initiating a train of oscillations in said tube and circuits, means connected to one of said circuits for sending out wave energy characteristic of the duration of said oscillations, and means in one of said circuits excited by reflected wave energy for reinitiating the above mentioned oscillations in said tube and circuits.

9. In a system operating on the reflection principle for determining the distance between two points, an oscillator comprising a tube having electrodes connected in circuits wherein, upon momentary external excitation, self sustained oscillations are caused to flow, means including a capacitor permanently connected in one of said circuits and operative when charged for causing said tube to become blocked on the completion of a substantially predetermined number of cycles, means for initiating a train of oscillations in said tube and circuits, means excited by energy from one of said circuits for sending out wave energy characteristic of the duration of said oscillations, means connecting one of said circuits to an electrode in said tube, and means in one of said circuits excited by reflected wave energy for impressing energy on said last named means and from said last named means on an electrode in said tube for re-initiating the above mentioned oscillations.

10. Apparatus for determining the distance between a reflecting object and a sensing device, comprising an electronic oscillator having a discharge tube and associated input and output circuits, means for normally applying a blocking bias to the input circuit of said tube, shock-excitation means connected to said output circuit and momentarily operative to cause said tube to generate a brief train of output waves, a radiator connected to the output circuit of said tube and arranged to emit said output waves, an energy collector arranged to receive said waves after reflection from said reflecting object, means responsive to the reflected wave energy received by said collector for so controlling said shock-excitation means that the repetition rate of successive trains of emitted output waves is determined as a function of the travel time of said reflected wave energy, and means for measuring the rate of repetition of said trains.

FRANCIS H. SHEPARD, JUNIOR.